June 27, 1933.  E. H. J. C. GILLETT  1,915,885
FREEWHEEL DEVICE
Filed Dec. 9, 1929
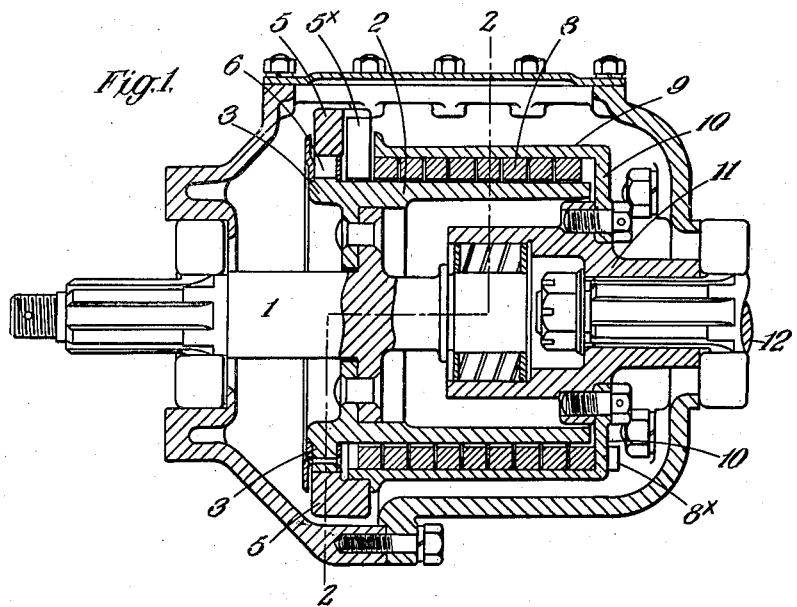
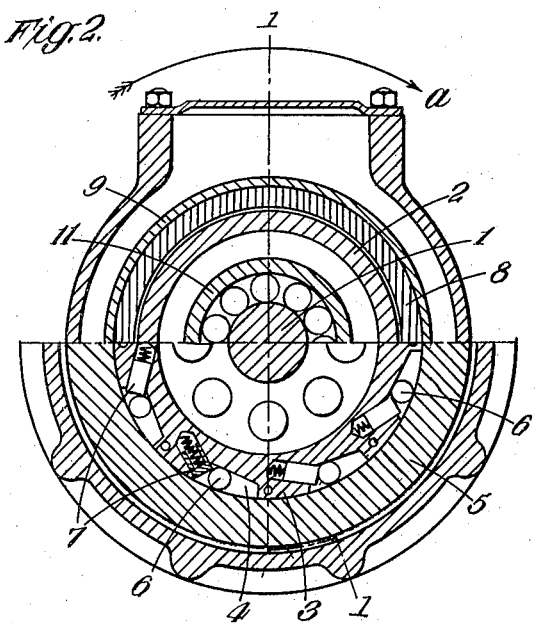
Inventor
E.H.J.C. Gillett
by Wilkinson & Giusta
Attorneys.

Patented June 27, 1933

1,915,885

UNITED STATES PATENT OFFICE

EDWARD HENRY JAMES CECIL GILLETT, OF LONDON, ENGLAND

FREEWHEEL DEVICE

Application filed December 9, 1929, Serial No. 412,902, and in Great Britain September 20, 1929.

The present invention relates to improvements in free wheel devices for transmitting rotary motion from one shaft to another in one direction and permitting the free overrun of the driving shaft.

In free wheel devices as hitherto known characterized by the use of a plurality of rolling members lying between the driving and driven members, the driving, driven and rolling members being so shaped that rotation of the driving shaft in the "forward" or driving direction causes the rolling members to jam and transmit the torque from the driving to the driven member, an objectionable feature has been the indentation and damaging of the faces of the driving and driven members by the rolling members due to shock loading, the full torque of the driving member being transmitted by the rolling and driven members and the "take-up" or engagement of the rolling members being sudden. Other types of free wheel devices for instance those comprising ratchets and pawls also present objectionable features mainly attributable to the fact that the whole torque load has been transmitted by such free wheel elements. It is an object of the present invention to provide a free wheel device in which these objectionable features are eliminated.

According to the present invention a free wheel device is provided in which the free wheel elements as above described are not subjected to the full driving torque, such free wheel elements being used only to engage and disengage a clutch or clutches which on engagement transmit the greater part of the driving torque, the torque load on the free wheel elements being limited substantially to that required to engage the clutch or clutches.

Disengagement of the clutch or clutches may conveniently be effected by spring means in which case the torque load carried by the free wheel elements will be limited to that necessary to overcome the force of such spring means.

According to a feature of this invention the said clutch may be of the self-energizing type in which the spring force to be overcome to initiate engagement may be of a light order, completion of engagement being automatic so that the torque load carried by the clutch engaging device may also be of a light order, thus avoiding the undesirable features inseparable from a free wheel wherein the whole torque load is transmitted by the free wheel elements.

In order that the nature of the present invention and the manner in which it is to be carried out may be more fully and easily understood one form of construction is described with reference to the accompanying drawing in which:

Fig. 1 is a longitudinal section of the device along the line 1—1 in Fig. 2 and

Fig. 2 is a transverse section along the line 2—2 in Fig. 1.

Referring to Figs. 1 and 2:—

A driving shaft 1 has fixed thereto a drum 2 flanged at 3. In the flange 3 are formed wedge-shaped peripheral notches 4. A ring 5 surrounds the flange 3. In the notches 4 lie rollers 6 which are held in contact with the bases of the notches and with the ring 5 by spring plungers 7.

To the ring 5 is attached at $5^x$ one end of the coil spring 8 which surrounds the drum 2 and lies within and is attached at the other end at $8^x$ to a second drum 9 flanged at 10 which is fixed to a sleeve 11, which is in turn splined to the driven shaft 12. When the shaft 1 is rotated in the direction of the arrow $a$ in Fig. 2, the flange 3 drives the ring 5 by means of the jamming action of the rollers 6 in the wedge shaped notches 4. The ring 5 by its rotation immediately causes the coil spring 8 to grip the drum 2. As soon as the coil spring 8 starts to grip the drum 2 the motion of the latter causes the spring 8 to grip the drum 2 tightly by a self-wrapping action, and the drive is thus communicated from the drum 2 by the spring 8 to the flange 10, the sleeve 11, and so to the shaft 12, no torque load being borne by the ring 5 other than that necessary to effect the initial engagement of the coil spring 8 and the drum 2.

What I claim is:—

1. In combination, drive and driven members, a helical spring member wound about said drive member being normally loose thereon and having one end affixed to the driven member, a ring on said drive member affixed to the other end of said spring member, and a light roller clutch interposed between said drive member and the ring for rotating the ring when the drive member is rotated in one direction whereby to cause initial winding and contraction of the spring about the drive member, the further tightening of the spring on the drive member being occasioned by the action of rotation of said drive member within the spring.

2. In combination, coaxial drive and driven shafts, a drum affixed to said drive shaft, a helical spring wound on the exterior of said drum, a housing extending on the exterior of said spring having a flange secured to the driven shaft, one end of said spring member being secured to said flange, a ring extending about said drum beyond said housing to which the other end of said spring member is affixed and a one-way light roller clutch carried by said drum within, and operating against, said ring whereby to drive the ring when the drum is rotated in one direction to initiate the winding and contraction of the spring member about the drum.

EDWARD HENRY JAMES CECIL GILLETT.